United States Patent
Tsukamoto

(10) Patent No.: US 7,949,423 B2
(45) Date of Patent: May 24, 2011

(54) ARTICLE STORAGE FACILITY AND CONTROL METHOD THEREFOR

(75) Inventor: Kunihiro Tsukamoto, Konan (JP)

(73) Assignee: Daifuku Co., Ltd., Osaka (JP)

( * ) Notice: Subject to any disclaimer, the term of this patent is extended or adjusted under 35 U.S.C. 154(b) by 927 days.

(21) Appl. No.: 11/899,133

(22) Filed: Sep. 4, 2007

(65) Prior Publication Data

US 2008/0053941 A1  Mar. 6, 2008

(30) Foreign Application Priority Data

Sep. 5, 2006 (JP) ................................. 2006-240322

(51) Int. Cl.
*G06F 7/00* (2006.01)
(52) U.S. Cl. ....................................................... 700/214
(58) Field of Classification Search .................. 700/213, 700/214; 414/279, 273
See application file for complete search history.

(56) References Cited

U.S. PATENT DOCUMENTS

| | | | |
|---|---|---|---|
| 3,661,280 A | | 5/1972 | Atwater |
| 6,948,899 B2 * | | 9/2005 | Lee ............... 414/254 |
| 6,968,257 B2 * | | 11/2005 | Ngo ............... 700/214 |
| 7,771,152 B2 * | | 8/2010 | Waltersbacher ....... 414/280 |
| 2004/0184901 A1 * | | 9/2004 | Taguchi et al. ........ 414/270 |
| 2004/0228709 A1 * | | 11/2004 | Ueda ............... 414/279 |
| 2004/0228710 A1 * | | 11/2004 | Ueda ............... 414/279 |
| 2005/0053450 A1 | | 3/2005 | Kantola et al. |
| 2005/0080524 A1 | | 4/2005 | Park |
| 2006/0051190 A1 * | | 3/2006 | Taguchi ............. 414/279 |
| 2006/0062656 A1 | | 3/2006 | Sugano et al. |
| 2006/0073002 A1 | | 4/2006 | Koide |
| 2006/0285948 A1 | | 12/2006 | Tsujimoto et al. |
| 2007/0068770 A1 | | 3/2007 | Koide et al. |

FOREIGN PATENT DOCUMENTS

| | | |
|---|---|---|
| EP | 1512661 A1 | 9/2005 |
| JP | 63169256 | 7/1988 |
| JP | 63225005 | 9/1988 |
| JP | 2000229708 | 8/2000 |
| JP | 2002175117 | 6/2002 |

\* cited by examiner

*Primary Examiner* — Gene Crawford
*Assistant Examiner* — Ramya Prakasam
(74) *Attorney, Agent, or Firm* — The Webb Law Firm

(57) ABSTRACT

An article storage facility includes a controller for controlling operation of a plurality of mobile bodies. The controller is constructed switchable between a total operation mode for causing all of the mobile bodies to engage in an article transporting operation for transporting articles between storage units and an article support, and a partial operation mode for causing part of the mobile bodies to engage in the article transporting operation. In the partial operation mode, a mobile body not selected as mobile body for the article transport operation is caused to travel to a retreating position clear of a traveling range of a mobile body selected as the mobile body for the article transport operation.

12 Claims, 7 Drawing Sheets

ARTICLE STORAGE FACILITY AND CONTROL METHOD THEREFOR

BACKGROUND OF THE INVENTION

This invention relates to an article storage facility and a control method for the storage facility. More particularly, the invention relates to an article storage facility and a control method for the storage facility, including an article storage structure with a plurality of storage units arranged in a horizontal direction and having a first storage structure end and a second storage structure end, an article support disposed on a side of the first storage structure end of the article storage structure for supporting articles to be stored or retrieved, a travel path extending in the horizontal direction and having a first path end located in association with the first storage structure end and a second path end located in association with the second storage structure end, a plurality of mobile bodies configured to travel along the travel path to transport articles between the article storage structure and the article support, each of the mobile bodies having an article transfer device, and a control device for controlling operation of the plurality of mobile bodies.

The above article storage facility causes the mobile bodies to perform article transporting operation for transporting articles between the storage units and article support. In a depositing operation an article on the article support is stored in one of the storage units of the article storage structure. In a delivering operation, an article in one of the storage units of the article storage structure is delivered to the article support.

Such an article storage facility aims at improved transport capacity by using a plurality of mobile bodies.

A conventional article storage facility includes two mobile bodies, article supports arranged adjacent opposite ends of an article storage structure longitudinally of a travel path, and a control device for controlling operation of the two mobile bodies. The control device causes one of the two mobile bodies to engage in an article transporting operation for transporting an article between one of the storage units and one of the article supports arranged adjacent the opposite ends of the article storage structure longitudinally of the travel path, and causes the other of the two mobile bodies to engage in an article transporting operation for transporting an article between one of the storage units and the other of the article supports arranged adjacent the opposite ends of the article storage structure longitudinally of the travel path (see Japanese Unexamined Patent Publication No. 2002-175117, for example).

This conventional article storage facility includes a common range formed in a middle portion of the article storage structure longitudinally of the travel path where any one of the two mobile bodies can enter but simultaneous entry of the two mobile bodies is restricted, and individual ranges formed at opposite sides of the common range longitudinally of the travel path, each individual range receiving only one of the two mobile bodies. The control device is constructed for controlling operation of the two mobile bodies such that admittance to the common range is restricted to one mobile body, and only one of the two mobile bodies is allowed to enter each individual range.

In the above conventional article storage facility, the two mobile bodies cannot enter the common range, and thus the two mobile bodies cannot transport articles simultaneously to storage units in the common range. Therefore, for transporting articles to the storage units in the common range, only the transport capacity of one mobile body is made available. There is a possibility that improvement in transport capacity cannot be realized.

SUMMARY OF THE INVENTION

This invention has been made having regard to such a disadvantage of the prior art, and its object is to provide an article storage facility for realizing an improvement in transport capacity.

An article storage facility according to this invention comprises:

an article storage structure with a plurality of storage units arranged in a horizontal direction and having a first storage structure end and a second storage structure end;

an article support disposed for supporting articles to be stored or retrieved;

a travel path extending in the horizontal direction and having a first path end located in association with the first storage structure end and a second path end located in association with the second storage structure end;

a plurality of mobile bodies configured to travel along the travel path to transport articles between the article storage structure and the article support, each of the mobile bodies having an article transfer device;

said article support being disposed on a side of said first storage structure end of said article storage structure, and being configured such that said plurality of mobile bodies may be arranged longitudinally of said travel path to allow said article transfer device of each of the plurality of said mobile bodies to transfer an article to the article support; and control means for controlling operation of said mobile bodies, said control means being configured to be switchable between a total operation mode wherein all of said mobile bodies are designated to be mobile bodies for transporting articles between said storage units and said article support, and a partial operation mode wherein less than all of said mobile bodies is or are designated to be a mobile body or mobile bodies for transporting articles between said storage units and said article transport;

wherein, in said total operation mode, a total mobile body operation transporting process is executed to control operations of said plurality of mobile bodies such that a storage unit closer to said second path end among said plurality of storage units is assigned as a transfer target for a mobile body closer to said second path end among said plurality of mobile bodies, and such that all of said mobile bodies simultaneously transport articles between said article support and storage units serving as transfer targets for respective mobile bodies among said plurality of storage units; and in said partial operation mode, a partial mobile body operation transporting process is executed to control operations of the plurality of mobile bodies to transport articles such that less than all of said plurality of mobile bodies closer to said first path end are selected as a mobile body, or mobile bodies, for article transport operation, the less than all mobile bodies selected being caused to travel between said article support and a storage unit, or storage units, serving as transfer target or targets for the mobile body, or bodies, among said plurality of storage units, and the mobile body or bodies not selected as the mobile body or bodies for the article transport operation being caused to travel to a retreating position clear of a traveling range of the mobile body or bodies selected for the article transport operation.

Thus, the control device is switchable to the total operation mode to execute the total mobile body operation transporting process. In the total mobile body operation transporting process, all of the mobile bodies can transport articles simultaneously between the article support and storage units to realize an improvement in transport capacity.

In the total mobile body operation transporting process, the mobile body located closer to the second path end travels a longer distance than the mobile body closer to the first path end. Thus, if the control device is always switched to the total operation mode to execute the total mobile body operation transporting process, the mobile body located closer to the second path end will have a longer integrated traveling distance than the mobile body closer to the first path end. Therefore, the mobile body located closer to the second path end will wear earlier, creating a need for frequent part-changing and maintenance operations. As a result, the part-changing and maintenance operations can become complicated, and the transportation of articles must be interrupted each time such operation is carried out, thereby diminishing transport capacity.

In addition to the total operation mode, the control device is switchable also to the partial operation mode. In the partial operation mode, the control device executes the partial mobile body operation transporting process. In the partial mobile body operation transporting process, part of the plurality of mobile bodies closer to the first path end is selected as a mobile body for article transport operation, and the part of the mobile bodies selected is caused to travel between the article support and a storage unit serving as transfer target for the mobile body among the plurality of storage units. Further, part of the mobile bodies closer to the second path end becomes a mobile body not selected as the mobile body for the article transport operation is caused to travel to a retreating position clear of a traveling range of the mobile body selected as the mobile body for the article transport operation. This can inhibit the part of the mobile bodies closer to the first path end wearing earlier. As a result, part-changing and maintenance operations are restrained from becoming complicated, and interruption of the transportation of articles for carrying out such operations is minimized to check diminution of transport capacity.

In the partial mobile body operation transporting process, the mobile body not selected as a mobile body for article transporting operation among the plurality of mobile bodies is caused to travel to the retreating position. Thus, with the mobile body not selected as the mobile body for article transporting operation presenting no obstruction, the mobile body selected as the mobile body for article transporting operation can travel along the travel path to transport articles. The articles can be transported efficiently.

In this way, the control device switches to the total operation modes to execute the total mobile body operation transporting process, or to the partial operation mode to execute the partial mobile body operation transporting process. Consequently, the article storage facility according to this invention, while realizing an improvement in transport capacity, can restrain part-changing and maintenance operations from becoming complicated, and minimize interruption of the transportation of articles for carrying out such operations to check diminution of transport capacity.

DETAILED DESCRIPTION OF THE PREFERRED EMBODIMENTS

An embodiment of article storage facility according to this invention will be described with reference to the drawings.

Figure 1:
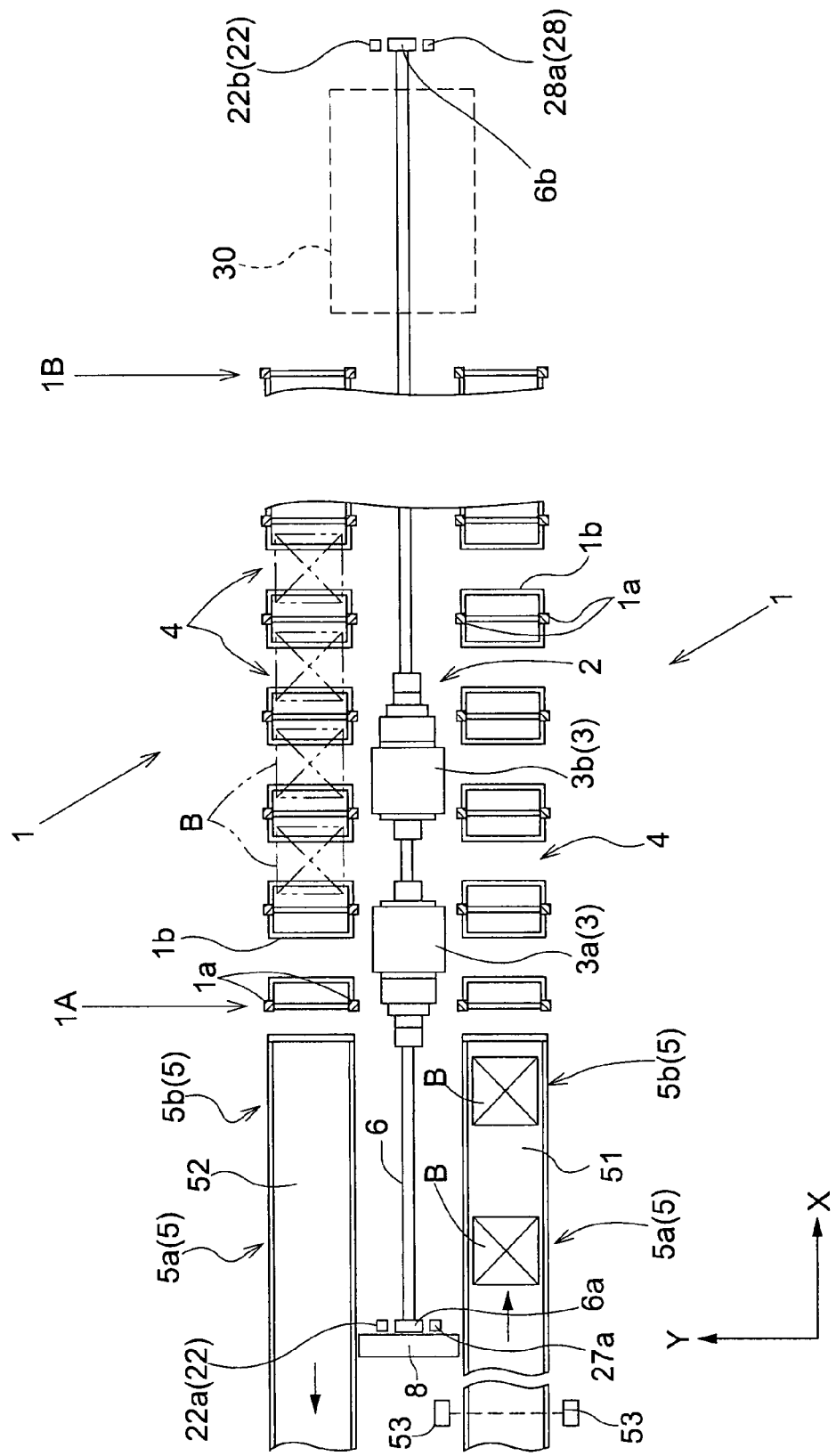
FIG. 1 is a plan view of an article storage facility.
Figure 2:
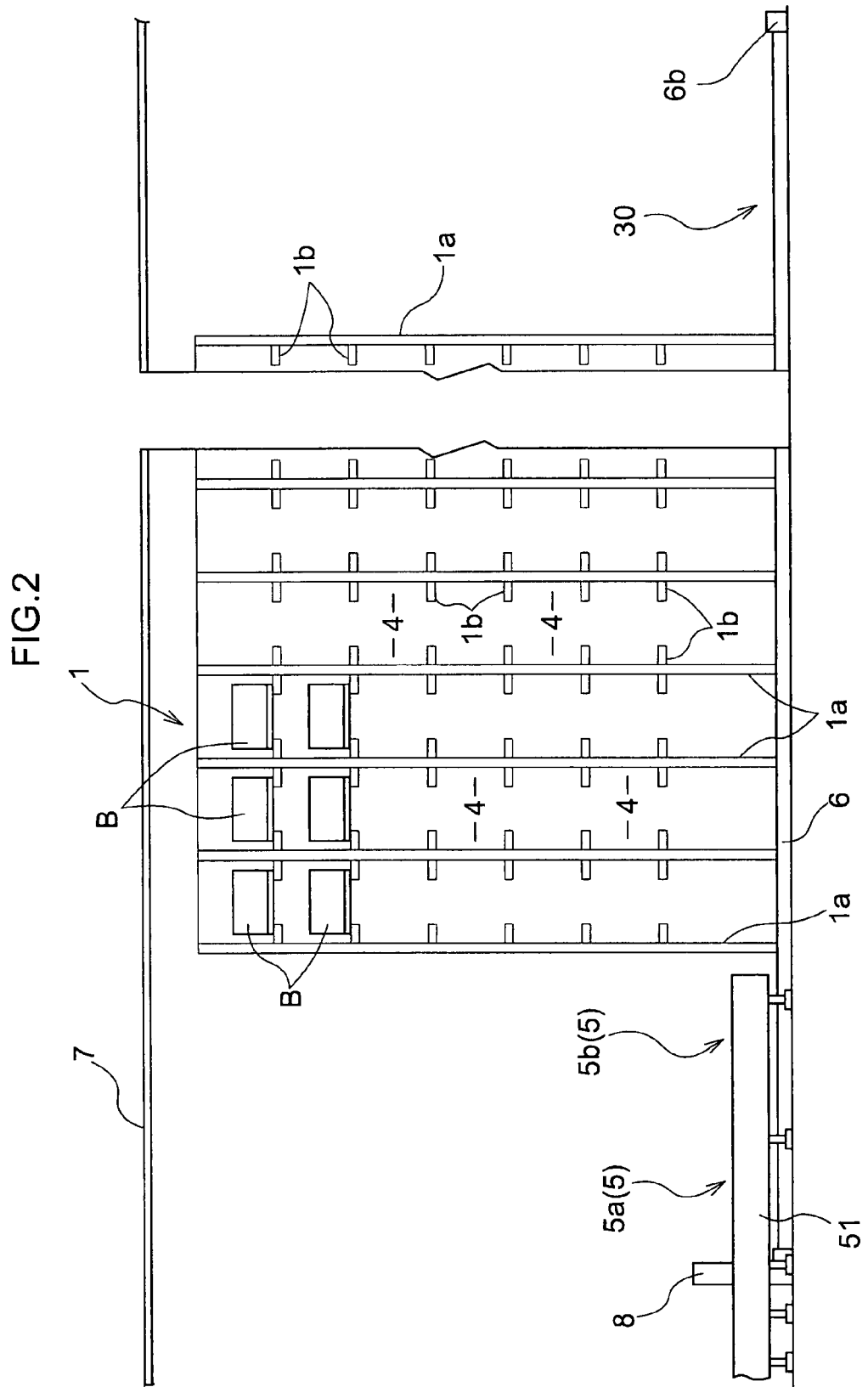
FIG. 2 is a side view of the article storage facility.

As shown in FIGS. 1 and 2, the storage facility includes two article storage racks 1 installed as spaced apart with opposed front planes for receiving and delivering articles B, an operating passage 2 formed between the two article storage racks 1, and stacker cranes 3 (mobile bodies for transporting articles) movable back and forth along the operating passage. That is, as shown in FIG. 1, each of the two article storage racks 1 extends in a horizontal direction indicated by X, and the two article storage racks 1 are installed as spaced apart in a horizontal direction indicated by Y.

Each article storage rack 1 has a plurality of struts 1a erected at intervals in the direction of rack width (horizontal direction X), and forming pairs spaced apart in the fore and aft direction Y, and a plurality of receiving supports 1b extending between the pairs of struts 1a spaced apart in the fore and aft direction Y for supporting articles B.

Each storage unit 4 is formed of a pair of right and left receiving supports 1b located adjacent each other in the direction of rack width to support one article B. A plurality of such storage units 4 are arranged vertically and in the direction of rack width X. In each of the two article storage racks 1, it is preferred that the storage units 4 at the extreme left-hand side shown in FIG. 1 define a first storage structure end 1A, and that the storage units 4 at the extreme right-hand side shown in FIG. 1 define a second storage structure end 1B.

The operating passage 2 includes a single rail track 6, which is an example of travel path 6, extending in the horizontal direction X. A guide rail 7 is disposed above to extend parallel to the rail track 6. Preferably, the rail track 6 extends linearly between a first path end 6a and a second path end 6b. The stacker cranes 3 are movable horizontally on the rail track 6 as guided by the guide rail 7.

A ground controller 8 is disposed adjacent the first path end 6a in the longitudinal direction of the rail track 6 to act as control device for controlling operation of the stacker cranes 3. The ground controller 8 is a device having components required to perform the operations described in this specification, such as a CPU, memory, communication circuits, and software including data and algorithms stored in the memory. The controller 8 itself belongs to the prior art, and is therefore not described in detail herein. The ground controller 8 manages storage information indicating which storage units 4 store articles B, and which articles B are stored when articles B are stored in particular storage units.

Adjacent one side of the article storage racks 1 (the side where the ground controller 8 is installed) in the longitudinal direction of the rail track 6, a loading conveyer 51 for loading articles B from the outside to be deposited in the article storage racks 1, and an unloading conveyer 52 for unloading articles B delivered from the article storage racks 1 to the outside, are arranged opposite each other across the rail track 6. The loading conveyer 51 has an article support portion 5 for deposition formed in a position adjacent the article storage rack 1 in the longitudinal direction of the rail track 6. The unloading conveyer 52 has an article support portion 5 for delivery formed in a position adjacent the article storage rack 1 in the longitudinal direction of the rail track 6.

The loading conveyer 51 includes an incoming article detecting sensor 53 having a light emitter and a light receiver for detecting articles B transported to the article support portion 5 for deposition. It is also possible to use, as the incoming article detecting sensor 53, other conventional sensors such as a sensor using sound, a contact sensor and so on. The loading conveyer 51 is configured to place an article B on the article support portion 5, for example, by receiving the article B with a stopper disposed in a position corresponding to the article support portion 5, or by stopping operation of the conveyer when an article detecting sensor disposed in a position corresponding to the article support portions 5 detects the article B transported to the article support portion 5. The unloading conveyer 52 is configured to operate to transport an article B to the outside when an article detecting sensor disposed in a position corresponding to the article support portions 5 detects the article B transported to the article support portion 5 for delivery.

The article support portion 5 includes two support portions arranged along the longitudinal direction of the rail track 6, which are a first article support portion 5a disposed adjacent the ground controller 8 in the longitudinal direction of the rail track 6, and a second article support portion 5b disposed away from the ground controller 8 in the longitudinal direction of the rail track 6. The article support portion 5 is constructed for allowing an article B to be transferred by an article transfer device 12 of each of the two stacker cranes 3 located side by side longitudinally of the rail track 6. When the second article support portion 5b downstream in the transport direction of the loading conveyer 51 is unloaded, an article B to be deposited is transported to the second article support portion 5b.

The two stacker cranes 3 are arranged longitudinally of the rail track 6 to travel on the same rail track 6. In this embodiment, the order of arrangement longitudinally of the rail track 6 is such that the first stacker crane 3a is located close to the article support portion 5, and the second stacker crane 3b is located far from the article support portion 5. That is, the first stacker crane 3a is closer to the end 6a of the rail track 6 adjacent the article support portion 5 than is the second stacker crane 3b.

Figure 3:
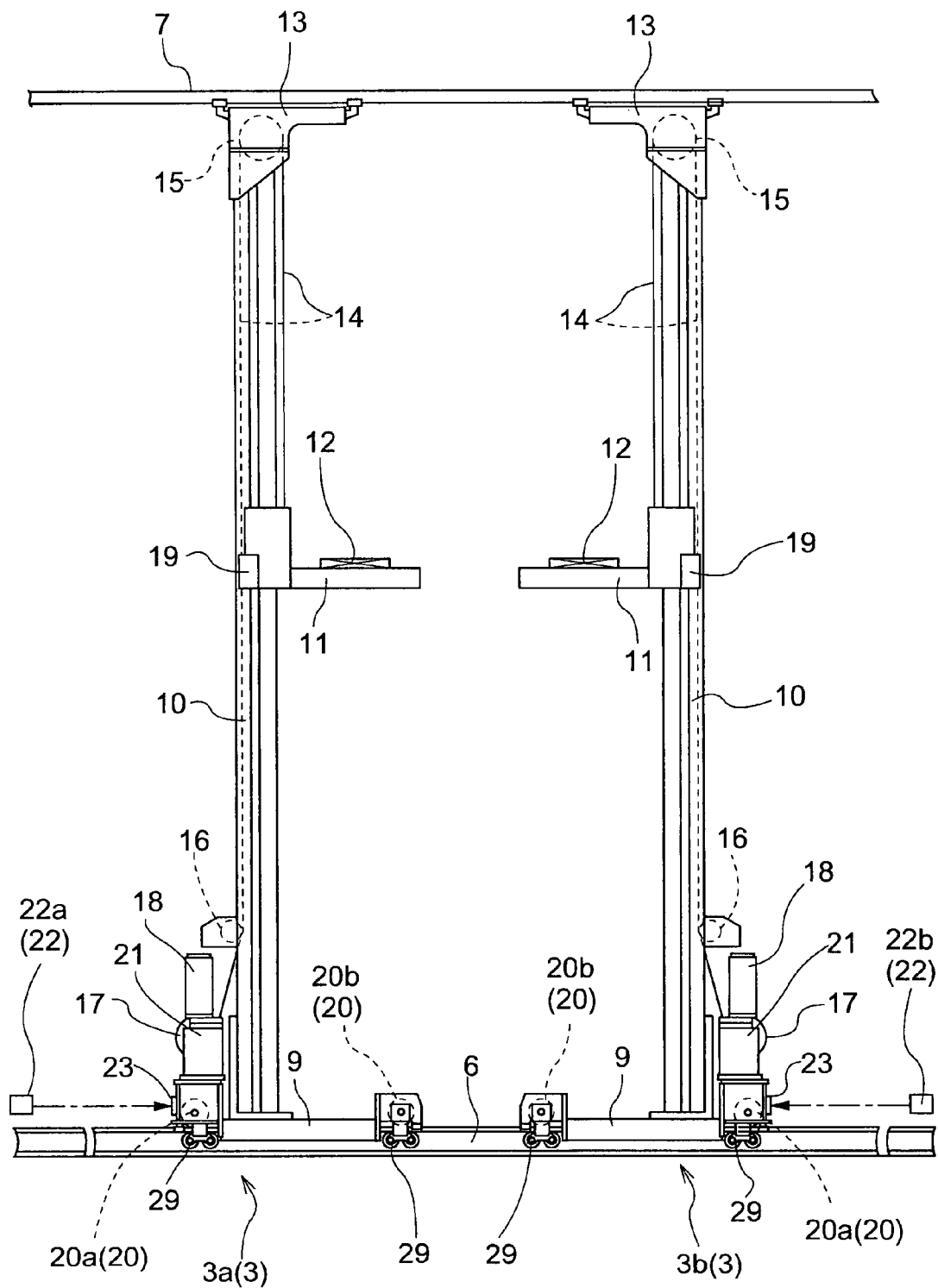
FIG. 3 is a side view of stacker cranes.

As shown in FIG. 3, each of the two stacker cranes 3 includes a carriage 9 acting as a mobile member for traveling back and forth along the rail track 6, a lift deck 11 acting as a lift member vertically movable along a lift guide mast 10 erected on the carriage 9, and article transfer device 12 acting as article transfer means mounted on the lift deck 11. Although not shown, the article transfer device 12 has a pair of arms for supporting an article B, which are mounted on the lift deck 11 to be extendible and retractable in directions perpendicular to the longitudinal direction of the rail track 6. By moving the pair of arms to project from the lift deck 11, an article B is received from a transfer target, or an article B is stored in a transfer target. It is possible to replace the pair of arms with a conventional technique, such as a conveyer. It is also possible to use an article transfer device 12 having a first arm swingable relative to the lift deck 11, a second arm swingably attached to the forward end of the first arm, and a support attached to the forward end of the second arm for supporting an article B.

Each of the stacker cranes 3 has the single lift guide mast 10. The single lift guide mast 10 is erected on an end portion of the carriage 9 remote from the other stacker crane 3 adjoining longitudinally of the rail track 6.

The lift guide mast 10 has an upper frame 13 mounted on an upper end thereof to be guided by the guide rail 7.

The lift deck 11 is supported and guided for vertical movement by the lift guide mast 10 erected on the carriage 9, and is suspended by a lift wire 14. The lift wire 14 is wound around a guide pulley 15 attached to the upper frame 13 and a guide pulley 16 attached to the lift guide mast 10, and is connected to a take-up drum 17 disposed at one end of the carriage 9. The take-up drum 17 reversibly rotatable by an inverter-type lift electric motor 18 for winding and unwinding the lift wire 11 to move the lift deck 11 up and down.

The lift deck 11 includes a lift rotary encoder 19 for detecting vertical positions of the lift deck 11. This lift rotary encoder 19 is constructed as a lift distance detecting device for detecting a lift distance of the lift deck 11 from a reference vertical position longitudinally of the lift guide mast 10.

The reference vertical position is set to the position of the article transfer device 12 when the lift deck 11 is located on the carriage 9. Although not shown, the reference vertical position is detected by detecting a detection dog on the carriage 9 with a detecting element such as a limit switch on the lift deck 11. The rotary shaft of the lift rotary encoder 19 has a sprocket meshed with a chain extending longitudinally of the lift guide mast 10, to detect a lift distance of the lift deck 11 after detecting the reference vertical position.

In each of the two stacker cranes 3, the carriage 9 has a pair of front and rear running wheels 20 spaced apart longitudinally of the rail track 6. Each of the front and rear running wheels 20 has a backup roller 29 for contacting the rail track 6 from below to restrict upward movement relative to the rail track 6, thereby restraining uplift of the running wheel 20 from the rail track 6.

An inverter-type propelling electric motor 21 is provided for driving one of the front and rear running wheels 20, i.e. the running wheel 20a located remote from the other stacker crane 3 adjoining longitudinally of the rail track 6. This running wheel 20a is constructed as a running wheel for propulsion. The other of the front and rear running wheels 20, i.e. the running wheel 20b located close to the other stacker crane 3 adjoining longitudinally of the rail track 6 acts as a freely rotatable, driven wheel.

As shown in FIGS. 1 and 3, a laser range finder 22 for traveling is disposed at each of the opposite ends of the rail track 6 for emitting a range finding beam longitudinally of the rail track 6. The laser range finder 22 for traveling emits the beam toward a reflector 23 installed on the carriage 9 to detect a distance to the carriage 9.

The first laser range finder 22a for traveling disposed at the end 6a where the ground controller 8 is installed detects traveling positions of the carriage 9 of the first stacker crane 3a. The second laser range finder 22b for traveling disposed at the end 6b remote from the ground controller 8 detects traveling positions of the carriage 9 of the second stacker crane 3b.

Figure 4:
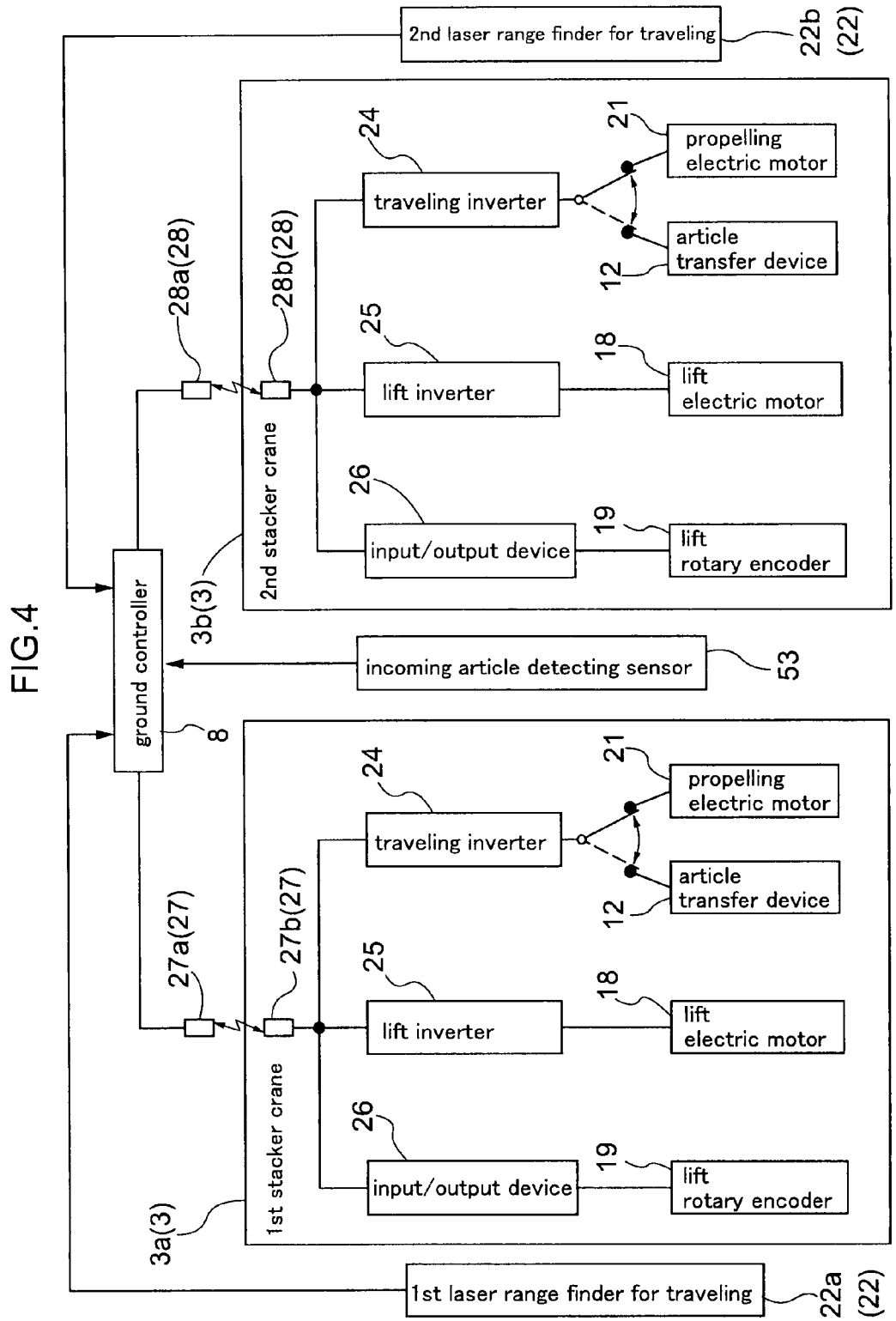
FIG. 4 is a control block diagram of the article storage facility.

As shown in FIG. 4, each of the two stacker cranes 3 includes a traveling inverter 24 switchable between a state of operating the propelling electric motor 21 and a state of operating the article transfer device 12, a lift inverter 25 for operating the lift electric motor 18, and an input/output device 26 for outputting detection information of the lift rotary encoder 19. The inverters described in this specification include circuits having a function for communicating with the ground controller 8, an encoder/decoder function and memory.

A communication controller (not shown) is provided for the ground controller 8, and the traveling inverter 24, lift inverter 25 and input/output device 26 of each stacker crane 3. A first optical transmission device 27 is provided for transmitting (exchanging) information between the ground controller 8 and the first stacker crane 3a. A second optical transmission device 28 is provided for transmitting information between the ground controller 8 and the second stacker crane 3b.

The first optical transmission device 27 and second optical transmission device 28 are constructed to exchange information by optical transmission between optical transmission devices 27a and 28a on the ground and optical transmission devices 27b and 28b on the stacker cranes 3. The optical transmission devices 27a and 28a on the ground are arranged at the ends of the rail track 6 as shown in FIG. 1. The optical transmission device 27a on the ground of the first optical transmission device 27 is disposed by the side of the first laser range finder 22a for traveling. The optical transmission device 28a on the ground of the second optical transmission device 28 is disposed by the side of the second laser range finder 22b for traveling. These optical transmission devices transmit information using light, and belong to the prior art. Each optical transmission device includes elements required for exchange of information using light, such as a light transmitter, a light receiver and circuits having encoder and decoder functions.

A communication network is constructed by the communication controller provided for the ground controller 8, the communication controller provided for each of the traveling inverter 24, lift inverter 25 and input/output device 26, the first optical transmission device 27 and second optical transmission device 28. In this communication network, the ground controller 8 acts as master controller, while the traveling inverter 24, lift inverter 25 and input/output device 26 act as slave controllers.

The detection information of the first laser range finder 22a for traveling and the second laser range finder 22b for traveling is inputted to the ground controller 8. The ground controller 8 is configured to control the traveling positions of the carriage 9 of the first stacker crane 3a and the traveling positions of the carriage 9 of the second stacker crane 3b.

The detection information of the lift rotary encoder 19 provided for each of the two stacker cranes 3 is inputted to the ground controller 8 through the above communication network. The ground controller 8 is configured to control the vertical positions of the lift deck 11 of the first stacker crane 3a and the vertical positions of the lift deck 11 of the second stacker crane 3b.

The ground controller 8 gives various commands to the traveling inverter 24 and lift inverter 25 of each of the two stacker cranes 3 through the above communication network. Thus, the ground controller 8 controls operation of the two stacker cranes 3 by controlling the traveling operation of the carriage 9, the lift operation of the lift deck 11 and the article transfer operation of the article transfer device 12 of each of the two stacker cranes 3.

The ground controller 8 is switchable between a total operation mode for causing both of the stacker cranes 3 to engage in an article transporting operation for transporting articles B between the storage units 4 and article support portions 5, and a partial operation mode for causing one of the stacker cranes 3 to engage in the article transporting operation.

The total operation mode will be described hereinafter.

Figure 5:
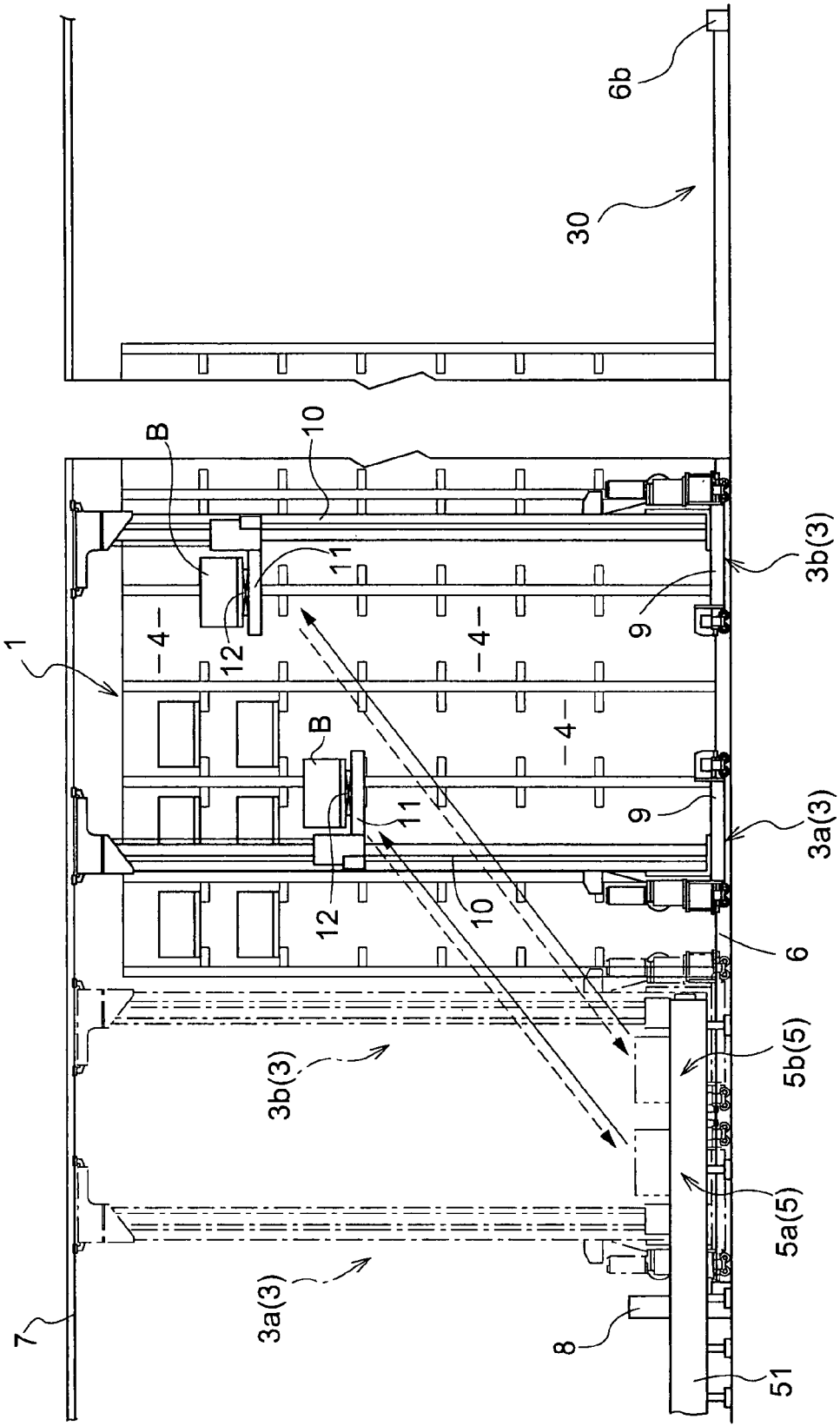
FIG. 5 is a view showing operation in a total mobile body operation transporting process.

As shown in FIG. 5, the ground controller 8 is configured to perform a total mobile body operation transporting process for controlling operation of the two stacker cranes 3 such that the two stacker cranes 3 transport articles B while simultaneously traveling between the article support portion 5 and storage units 4 serving as transfer targets for the respective stacker cranes 3 among the plurality of storage units 4. In determining transfer targets for the respective stacker cranes 3, a storage unit 4 farther away from the article support portion 5, among the plurality of storage units 4, is allotted to the stacker crane 3 farther away from the article support portion 5 in the order of arrangement along the longitudinal direction of the rail track 6.

The total mobile body operation transporting process will be described further.

As described hereinbefore, and as shown in FIG. 1, the stacker crane 3 disposed in a position close to the first path end 6a is called first stacker crane 3a, and the stacker crane 3 disposed in a position close to the second path end 6b is called second stacker crane 3b.

The ground controller 8 allots a storage unit 4 as transfer target from among the plurality of storage units 4 to each of the two stacker cranes 3. Assume, at this time, that one (first storage unit) of the two storage units 4 serving as the transfer targets is closer in the horizontal direction X to the first path end 6a than is the other (second storage unit) of the two storage units 4. That is, it is assumed that the second storage unit is closer to the second path end 6b than is the first storage unit. In this case, the ground controller 8 allots the first storage unit to the first stacker crane 3a, and the second storage unit to the second stacker crane 3b.

Regarding the article support portion 5, the ground controller 8 allots the first article support portion 5a as transfer target to the first stacker crane 3a, and the second article support portion 5b as transfer target to the second stacker crane 3b.

When transporting articles B on the article support portion 5 to the storage units 4, the ground controller 8 controls traveling operation of the two carriages 9 and lifting operation of the two lift decks 11 of the two sets of stacker cranes 3, respectively, to locate the article transfer device 12 of the first stacker crane 3a in a target stop position corresponding to the first article support portion 5a, and to locate the article transfer device 12 of the second stacker crane 3b in a target stop position corresponding to the second article support portion 5b. Further, the ground controller 8 controls article transfer operation of the two article transfer devices 12 of the two stacker cranes 3 so that the two article transfer devices 12 receive the two articles B from the article support portion 5.

When the two articles B have been received from the article support portion 5, the ground controller 8 controls traveling operation of the two carriages 9 and lifting operation of the two lift decks 11 of the two sets of stacker cranes 3, respectively, to cause the two carriages 9 to travel simultaneously between the article support portion 5 and the storage units 4 serving as the transfer targets, to locate the article transfer device 12 of the first stacker crane 3a in a target stop position corresponding to the storage unit 4 (first storage unit) serving as the transfer target for the first stacker crane 3a, and to locate the article transfer device 12 of the second stacker crane 3b in a target stop position corresponding to the storage unit 4 (second storage unit) serving as the transfer target for the second stacker crane 3b. Further, the ground controller 8 controls article transfer operation of the two article transfer devices 12 of the two stacker cranes 3 so that the two article transfer devices 12 deposit the two articles B in the storage units 4 serving as the transfer targets. The above phrase "to cause the two carriages 9 to travel simultaneously" means that there exists a time when the carriage 9 of the second stacker crane 3b moves while the carriage 9 of the first stacker crane 3a is in movement. Therefore, "to cause the two carriages 9 to travel simultaneously" does not require the carriages 9 of the first stacker crane 3a and the carriages 9 of the second stacker crane 3b to start moving simultaneously.

For transporting articles B stored in the storage units 4 to the article support portion 5, the operation may only be reversed from the case of transporting articles B from the article support portion 5 to the storage units 4. Thus, this operation will be described briefly here.

The ground controller 8 controls traveling operation of the two carriages 9, lifting operation of the two lift decks 11 and article transfer operation of the two article transfer devices of the two stacker cranes 3, respectively, so that each of the two article transfer devices 12 of the two stacker cranes 3 receives an article B from the storage unit 4 serving as transfer target, and transfers the article B to the article support portion 5.

That is, the ground controller 8 determines two storage units 4 storing articles to be taken out of the article storage rack 1. Assume, at this time, that one (first storage unit) of the two storage units 4 is closer in the horizontal direction X to the first path end 6a than the other (second storage unit) of the two storage units 4. That is, it is assumed that the second storage unit is closer to the second path end 6b than is the first storage unit. Next, the ground controller 8 allots the first storage unit to the first stacker crane 3a, and the second storage unit to the second stacker crane 3b. Next, the ground controller 8 moves the first stacker crane 3a to a target stop position corresponding to the first storage unit by controlling traveling operation of the carriage 9 and lifting operation of the lift deck 11, and takes out the article by controlling operation of the article transfer device 12. Next, the ground controller 8 moves the first stacker crane 3a to the target stop position corresponding to first article support portion 5a by controlling traveling operation of the carriage 9 and lifting operation of the lift deck 11, and places the article on the first article support portion 5a by controlling operation of the article transfer device 12.

The ground controller 8, by similarly controlling the second stacker crane 3b, moves the article stored in the second storage unit to the second article support portion 5b.

The control of traveling operation of each carriage 9 by the ground controller 8 will be described further.

The ground controller 8 transmits traveling speed command information indicating a target traveling speed to each traveling inverter 24 through the communication network whenever a predetermined time passes, so that the traveling speed derived from the detection information of the laser range finder 22 for traveling follows a predetermined traveling speed pattern. The traveling inverter 24 adjusts a current value given to the propelling electric motor 21 so that the traveling speed of the carriage 9 agree to the target traveling speed indicated by the traveling speed command information.

When the detection information of the laser range finder 22 for traveling indicates that the carriage 9 is arriving at a position corresponding to a target stop position, the ground controller 8 transmits traveling stop command information to the traveling inverter 24 through the communication network, ordering the inverter 24 to stop the carriage 9. In response to the traveling stop command information, the traveling inverter 24 stops operation of the traveling electric motor 21 and applies the brakes to stop the traveling operation of the carriage 9.

Incidentally, the predetermined traveling speed pattern defines target traveling speeds of the carriage 9 in relationship with progress of time. In an early stage of traveling of the carriage 9, the traveling speed of the carriage 9 is increased to a steady speed with a predetermined acceleration, and is thereafter maintained at the steady speed. When lapsed time after starting the traveling of the carriage 9 reaches a time for starting a slowdown, the traveling speed is reduced to a speed for stopping (creep speed) with a predetermined deceleration, and is thereafter maintained at the speed for stopping. When the carriage 9 arrives at a target traveling position, the traveling of the carriage 9 is stopped. The predetermined acceleration, steady speed, predetermined deceleration and speed for stopping have values set beforehand based on experiment, for example.

The control of lifting operation of each lift deck 11 by the ground controller 8 will be described.

The ground controller 8 transmits lift speed command information indicating a target lift speed to each lift inverter 25 through the communication network whenever a predetermined time passes, so that the lift speed derived from the detection information of the lift rotary encoder 19 follows a predetermined lift speed pattern. The lift inverter 25 adjusts a current value given to the lift electric motor 18 so that the lift speed of the lift deck 11 agree to the target lift speed indicated by the lift speed command information. This rotary encoder 19 itself belongs to the prior art, and will not be described.

When the detection information of the lift rotary encoder 19 indicates that the lift deck 11 is arriving at a position corresponding to a target stop position, the ground controller 8 transmits lift stop command information to the lift inverter 25 through the communication network, ordering the inverter 24 to stop the lift deck 11. In response to the lift stop command information, the lift inverter 25 stops operation of the lift electric motor 18 and applies the brakes to stop the lift operation of the lift deck 11.

The predetermined lift speed pattern is similar to the above traveling speed pattern, and its particulars will not be described.

To add a description of the control of article transfer operation of the article transfer device 12 by the ground controller 8, the ground controller 8 transmits transfer command information to the traveling inverter 24 through the communication network, for the article transfer device 12 to transfer an article B. In response to the transfer command information, the traveling inverter 24 causes an article transfer operation of the article transfer device 12 to transfer the article B to or from a transfer target.

The partial operation mode will be described hereinafter.

Figure 6:
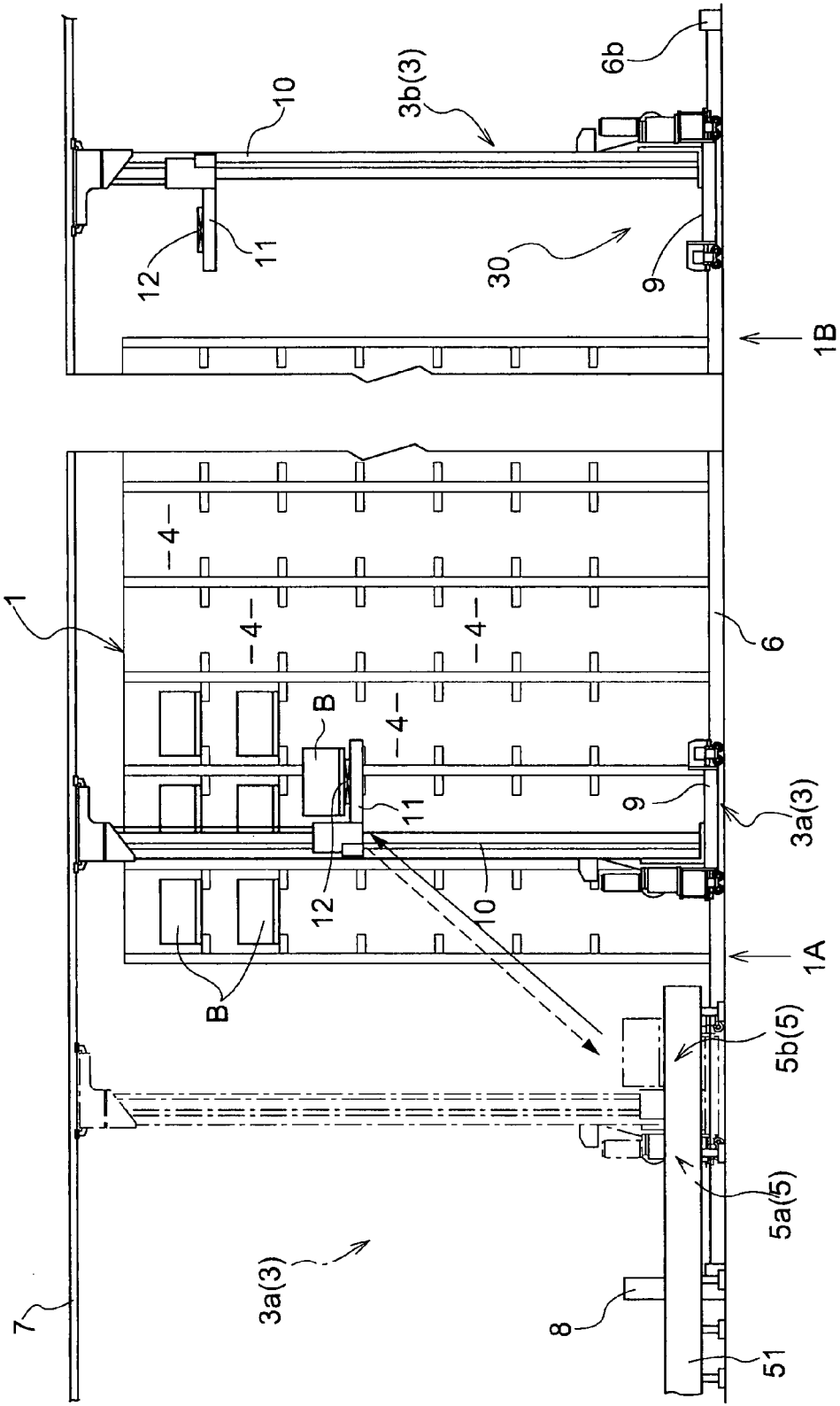
FIG. 6 is a view showing operation in a partial mobile body operation transporting process.

As shown in FIG. 6, the ground controller 8 is configured to perform a partial mobile body operation transporting process for controlling operation of the two stacker cranes 3 to transport articles B. In this process, one of the two stacker cranes 3 closer to the article support portion 5 in the order of arrangement along the longitudinal direction of the rail track 6 is selected as the stacker crane 3 for the article transport operation. The one of the stacker cranes 3 selected is caused to travel between the article support portion 5 and storage units 4 serving as transfer targets for the stacker crane 3. The other stacker crane 3 not selected as the stacker crane 3 for the article transport operation is caused to travel to a retreating position clear of a traveling range of the stacker crane 3 selected as the stacker crane 3 for the article transport operation.

In the partial mobile body operation transporting process, the ground controller 8, as shown in FIGS. 1 and 6, provides a set retreat position 30 outward of the article storage racks 1 at the side remote from the article support portion 5 in the longitudinal direction of the rail track 6 (i.e. an area near the second path end 6b), as the retreating position for the stacker crane 3, of the two stacker cranes 3, not selected as the mobile body for the article transport operation.

The partial mobile body operation transporting process will be described further.

The ground controller 8 selects the first stacker crane 3a as stacker crane 3 for the article transport operation, and does not select the second stacker crane 3b as stacker crane 3 for the article transport operation. The ground controller 8 allots the article support portion 5 serving as transfer target for the first stacker crane 3a to the second article support portion 5b, and allots one of the storage units 4 as target transfer for the first stacker crane 3a.

The ground controller 8 controls operation of the second stacker crane 3b for causing the second stacker crane 3b to travel to the set retreat position 30, and controls operation of the first stacker crane 3a for causing the first stacker crane 3a to perform the article transport operation between the article support portion 5 and storage unit 4.

To add a description of the control of operation of the second stacker crane 3b by the ground controller 8, the ground controller 8, as in the control of traveling operation of the carriage 9 described hereinbefore, causes the carriage 9 to perform a traveling operation by transmitting traveling speed command information indicating a target traveling speed to the traveling inverter 24 through the communication network whenever a predetermined time passes, so that the traveling speed derived from the detection information of the laser range finder 22 for traveling follows a predetermined traveling speed pattern.

When the detection information of the second laser range finder 22b for traveling indicates that the carriage 9 is arriving at a position corresponding to the set retreat position 30, the ground controller 8 transmits traveling stop command information to the traveling inverter 24 through the communication network, ordering the inverter 24 to stop the carriage 9. The position corresponding to the set retreat position 30 is set beforehand.

The control of operation of the first stacker crane 3a by the ground controller 8 will be described.

When transporting an article B on the article support portion 5 to a storage unit 4, the ground controller 8 controls traveling operation of the carriage 9 and lifting operation of the lift deck 11 of the first stacker crane 3a to locate the article transfer device 12 of the first stacker crane 3a in a target stop position corresponding to the second article support portion 5b. Further, the ground controller 8 controls article transfer operation of the article transfer device 12 of the first stacker crane 3a so that the article transfer device 12 receive the article B from the second article support portion 5b.

When the article transfer device 12 has received the article B, the ground controller 8 controls traveling operation of the carriage 9 and lifting operation of the lift deck 11 of the first stacker crane 3a to locate the article transfer device 12 of the first stacker crane 3a in a target stop position corresponding to the storage unit 4 serving as the transfer target. Further, the ground controller 8 controls article transfer operation of the article transfer device 12 of the first stacker crane 3a to deposit the articles B in the storage unit 4 serving as the transfer target.

For transporting an article B stored in the storage unit 4 to the article support portion 5, the operation may be reversed from the case of transporting the article B from the article support portion 5 to the storage units 4. That is, the ground controller 8 controls traveling operation of the carriage 9, lifting operation of the lift deck 11 and article transfer operation of the article transfer device of the first stacker crane 3a, so that the article transfer device 12 of the first stacker crane 3a receives the article B from the storage unit 4 serving as transfer target, and transfers the article B to the second article support portion 5b.

A switching by the ground controller 8 between the total operation mode and partial operation mode will be described.

The ground controller 8 monitors the quantities of articles transported between the article storage racks 1 and article support portions 5.

Specifically, the ground controller 8 monitors the quantity of incoming articles transported per unit time by deriving the number of articles conveyed from the position of incoming article detecting sensor 53 to the article support portion 5, from detection information of the incoming article detecting sensor 53 of the loading conveyer 51. The ground controller 8 monitors also the quantity of outgoing articles transported per unit time by deriving the number of articles transported from the storage units 4 to the article support portion 5, from delivery requirement information requiring delivery of articles B stored in the storage units 4 to the article support portion 5. In this way, the ground controller 8 monitors the quantity of articles transported per unit time by monitoring the quantity of incoming articles transported per unit time and the quantity of outgoing articles transported per unit time.

Regarding the control of the quantity of articles transported, for example, the ground controller 8 may control a daily article transporting schedule providing which articles are to be transported at which time based on deposition requirement information showing how many articles are deposited in which time zone, and delivery requirement information showing how many articles are delivered in which time zone. The quantity of articles transported per unit time may be controlled based on this article transporting schedule. The quantity of articles transported may be controlled through various other arrangements.

Figure 7:
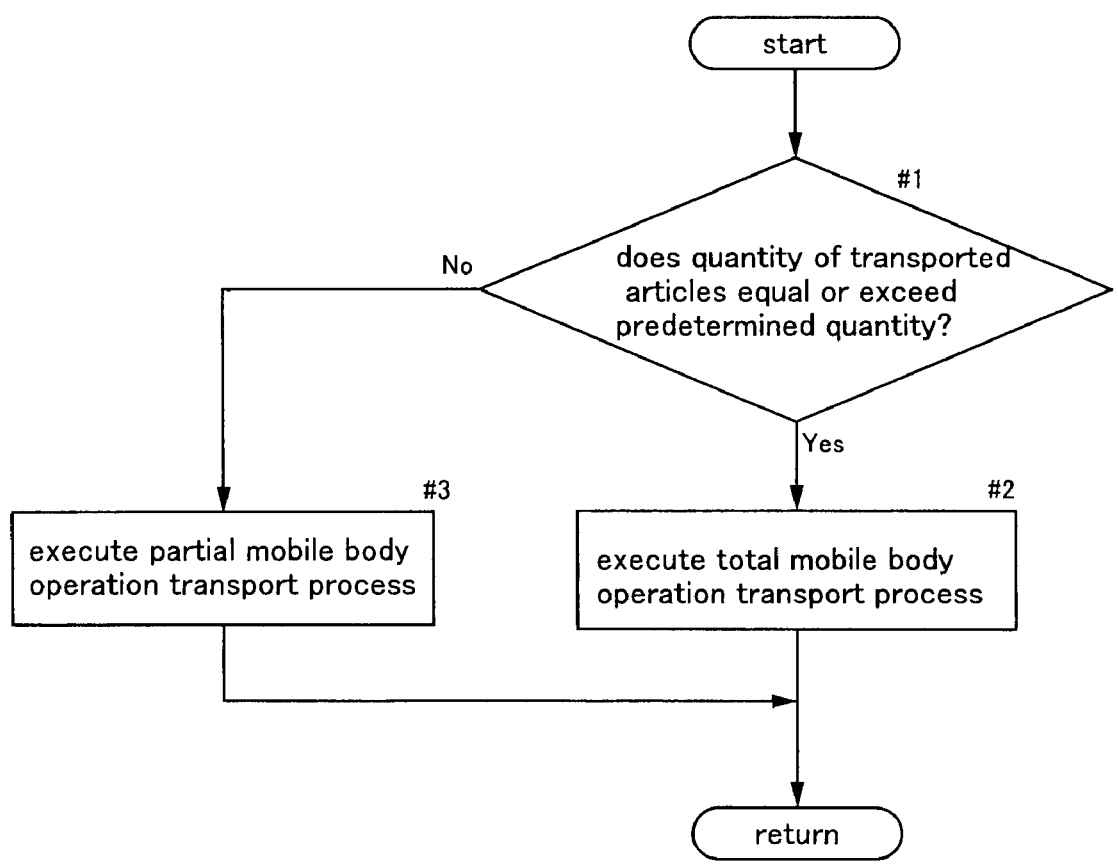
FIG. 7 is a flow chart showing operation of a ground controller.

As shown in the flow chart of FIG. 7, the ground controller 8 checks upon lapse of each unit time whether the quantity of article transported per unit time equals or exceeds a predetermined quantity (step 1). When the quantity of articles transported per unit time equals or exceeds the predetermined quantity, the ground controller 8 executes the total mobile body operation transporting process (step 2). When the quantity of articles transported per unit time is less than the predetermined quantity, the ground controller 8 executes the partial mobile body operation transporting process (step 3).

Other Embodiments (1) In the foregoing embodiment, the ground controller 8, in the partial mobile body operation transporting process, provides the set retreat position 30 as the retreating position for the stacker crane 3 not selected as the stacker crane 3 for the article transport operation, and causes the stacker crane 3 not selected as the stacker crane 3 for the article transport operation to travel to the set retreat position 30. The retreating position for the stacker crane 3 not selected as stacker crane 3 for the article transport operation is not limited to the set retreat position 30. The retreating position may be any position displaced from the traveling range of the stacker crane 3 selected for the article transport operation.

(2) In the foregoing embodiment, the ground controller 8 monitors the quantity of articles transported, and switches between the total mobile body operation transporting process and partial mobile body operation transporting process, depending on whether or not the quantity of articles transported equals or exceeds a predetermined quantity. It is possible, for example, to set beforehand, time zones of the day for performing the total mobile body operation transporting process and time zones for performing the partial mobile body operation transporting process. Then, the ground controller 8 can determine in which time zone it now is, to select between the total mobile body operation transporting process and partial mobile body operation transporting process.

Thus, varied arrangements can be adopted for the ground controller 8 to rely on in selecting between the total mobile body operation transporting process and partial mobile body operation transporting process.

(3) In the foregoing embodiment, one ground controller 8 is provided for controlling operation of the two stacker cranes 3. The control structure for controlling operation of the two stacker cranes 3 may be varied as appropriate. For example, in addition to the ground controller, each of the two stacker cranes 3 may include a crane controller. The operation of the two stacker cranes 3 may be controlled by communicating various information between the ground controller and crane controllers.

(4) The foregoing embodiment illustrates the laser range finders 22 for traveling as the device for detecting traveling positions of the carriages 9 on the rail track 6. Various other devices may be employed instead, such as rotary encoders rotatable with traveling of the carriages 9.

The device for detecting vertical positions of each lift deck 11 is not limited to the lift rotary encoder 19. Various other devices may be employed instead, such as a laser range finder.

(5) In the foregoing embodiment, part of each conveyer 51 is used as the article support portion 5. The article support portion 5 may simply be a load support table for receiving an article B. Thus, the article support portion 5 is variable as appropriate. In the foregoing embodiment, articles are loaded on the first article support portion 5a and second article support portion 5b so as to fill the forward, second article support portion 5b first. It is also possible to load the articles on the first article support portion 5a and second article support portion 5b, while selecting which of the first article support portion 5a and second article support portion 5b should be loaded. In this case, the ground controller 8, in the partial mobile body operation transporting process, is configured to allot whichever of the first article support portion 5a and second article support portion 5b loaded with an article B as the article support portion 5 serving as transfer target.

(6) The foregoing embodiment includes two stacker cranes 3 by way of example. For example, three stacker cranes 3 may be provided instead. The number of stacker crane 3 may be varied as appropriate.

What is claimed is:

1. An article storage facility comprising:
    an article storage structure with a plurality of storage units arranged in a horizontal direction and having a first storage structure end and a second storage structure end;
    an article support disposed for supporting articles to be stored or retrieved;
    a travel path extending in the horizontal direction and having a first path end located in association with the first storage structure end and a second path end located in association with the second storage structure end;
    a plurality of mobile bodies configured to travel along the travel path to transport articles between the article storage structure and the article support, each of the mobile bodies having an article transfer device;
    said article support being disposed on a side of said first storage structure end of said article storage structure, and being configured such that said plurality of mobile bodies may be arranged longitudinally of said travel path to allow said article transfer device of each of the plurality of said mobile bodies to transfer an article to or from the article support, the article support being configured to perform at least one of (a) allowing transfer of articles from the article support to one or more of the plurality of mobile bodies when storing articles brought in from outside the article storage facility, and (b) allowing transfer of articles from one or more of the plurality of mobile bodies to the article support when retrieving articles from one of the storage units to outside the article storage facility; and
    control means for controlling operation of said mobile bodies, said control means being configured to be switchable between a total operation mode wherein all of said mobile bodies are designated to be mobile bodies for transporting articles between said storage units and said article support, and a partial operation mode wherein less than all of said mobile bodies is or are designated to be a mobile body or mobile bodies for transporting articles between said storage units and said article transport;
    wherein, in said total operation mode, a total mobile body operation transporting process is executed to control operations of said plurality of mobile bodies such that a storage unit closer to said second path end among said plurality of storage units is assigned as a transfer target for a mobile body closer to said second path end among said plurality of mobile bodies, and such that all of said mobile bodies simultaneously transport articles between said article support and storage units serving as transfer targets for respective mobile bodies among said plurality of storage units; and
    in said partial operation mode, a partial mobile body operation transporting process is executed to control operations of the plurality of mobile bodies to transport articles such that less than all of said plurality of mobile bodies closer to said first path end are selected as a mobile body, or mobile bodies, for article transport operation, the less than all mobile bodies selected being caused to travel between said article support and a storage unit, or storage units, serving as transfer target or targets for the mobile body, or bodies, among said plurality of storage units, and the mobile body or bodies not selected as the mobile body or bodies for the article transport operation being caused to travel to a retreating position clear of a traveling range of the mobile body or bodies selected for the article transport operation.

2. An article storage facility as defined in claim 1, wherein said control means is configured to set, in said partial operation mode, a position associated with said second path end of said travel path and outward of said article storage structure as said retreating position for, the mobile body not selected as the mobile body, or bodies, for the article transport operation among said plurality of mobile bodies.

3. An article storage facility as defined in claim 1, wherein said control means is configured to monitor the quantity of articles transported between said article storage structure and said article support, to execute said total mobile body operation transporting process when the quantity of articles transported is greater than a predetermined quantity, and to execute said partial mobile body operation transporting process when the quantity of articles transported is less than the predetermined quantity.

4. An article storage facility as defined in claim 1, wherein:
    said article storage structure includes an article storage rack having said storage units arranged horizontally and vertically;
    said mobile bodies are stacker cranes, each including a carriage configured to travel along said travel path, and a lift member having said article transfer device and vertically movable along a lift guide mast erected on said carriage; and
    said plurality of mobile bodies are two said stacker cranes.

5. A method of controlling an article storage facility, said article storage facility having:
- an article storage structure with a plurality of storage units arranged in a horizontal direction and having a first storage structure end and a second storage structure end;
- an article support disposed for supporting articles to be stored or retrieved;
- a travel path extending in the horizontal direction and having a first path end located in association with the first storage structure end and a second path end located in association with the second storage structure end; and
- a plurality of mobile bodies configured to travel along the travel path to transport articles between the article storage structure and the article support, each of the mobile bodies having an article transfer device;
- said article support being disposed on a side of said first storage structure end of said article storage structure, and is configured such that said plurality of mobile bodies may be arranged longitudinally of said travel path to allow said article transfer device of each of the plurality of said mobile bodies to transfer an article to or from the article support;
- said method comprising the steps of:
- determining which, of a total operation mode wherein all of said mobile bodies are designated to be mobile bodies for transporting articles between said storage units and said article support, and a partial operation mode wherein less than all of said mobile bodies is or are designated to be a mobile body or mobile bodies for transporting articles between said storage units and said article transport, is selected;
- when said total operation mode is selected, assigning a storage unit closer to said second path end among said plurality of storage units as a transfer target for a mobile body closer to said second path end among said plurality of mobile bodies, and causing all of said mobile bodies simultaneously transport articles between said article support and storage units serving as transfer targets for respective mobile bodies among said plurality of storage units; and
- when said partial operation mode is selected, selecting less than all of said plurality of mobile bodies closer to said first path end as a mobile body, or mobile bodies, for article transport operation, and causing the less than all mobile bodies selected to transport an article or articles by traveling between said article support and a storage unit, or storage units, serving as transfer target or targets for the mobile body, or bodies, and causing the mobile body or bodies not selected as the mobile body or bodies for the article transport operation to travel to a retreating position clear of a traveling range of the mobile body or bodies selected for the article transport operation wherein when either of the total operation mode and the partial operation mode is selected, the step of causing the transport of an article or articles includes causing transfer of an article or articles from the article support to one or more of the plurality of mobile bodies when storing the article or articles are brought in from outside the article storage facility, and causing transfer of an article or articles from one or more of the plurality of mobile bodies to the article support when retrieving the article or articles from one or more of the storage units to outside the article storage facility.

6. A method as defined in claim 5, further comprising a step of:
- in said partial operation mode, setting a position associated with said second path end of said travel path and outward of said article storage structure, as said retreating position for the mobile body or bodies not selected as the mobile body or bodies for the article transport operation among said plurality of mobile bodies.

7. A method as defined in claim 5, further comprising the steps of:
- monitoring the quantity of articles transported between said article storage structure and said article support;
- comparing said quantity of articles transported and a predetermined quantity;
- selecting said total mobile body operation transporting process when the step of comparing indicates that the quantity of articles transported is greater than said predetermined quantity; and
- selecting said partial mobile body operation transporting process when the step of comparing indicates that the quantity of articles transported is less than the predetermined quantity.

8. A method as defined in claim 5, wherein:
- said article storage structure includes an article storage rack having said storage units arranged horizontally and vertically;
- said mobile bodies are stacker cranes, each including a carriage configured to travel along said travel path, and a lift member having said article transfer device and vertically movable along a lift guide mast erected on said carriage; and
- said plurality of mobile bodies are two said stacker cranes.

9. An article storage facility as defined in claim 1, wherein the article support is provided independently of the storage units.

10. An article storage facility as defined in claim 9, wherein the article support is a part of a conveyer device.

11. A method as defined in claim 5, wherein the article support is provided independently of the storage units.

12. A method as defined in claim 11, wherein the article support is a part of a conveyer device.

* * * * *

UNITED STATES PATENT AND TRADEMARK OFFICE
CERTIFICATE OF CORRECTION

PATENT NO.       : 7,949,423 B2
APPLICATION NO.  : 11/899133
DATED            : May 24, 2011
INVENTOR(S)      : Kunihiro Tsukamoto It is certified that error appears in the above-identified patent and that said Letters Patent is hereby corrected as shown below:

Claim 2, col. 14, line 46, delete "," between "for" and "the"

Claim 5, col. 15, last line, insert --,-- at end of paragraph after "operation"

Signed and Sealed this
Fourth Day of October, 2011

David J. Kappos
*Director of the United States Patent and Trademark Office*